May 22, 1951 K. O. LARSON 2,553,658
METERING TAPE DISPENSER
Filed July 17, 1948

Inventor
Karl O. Larson
By Carpenter Abbott Coulter & Kinney
Attorneys

Patented May 22, 1951

2,553,658

UNITED STATES PATENT OFFICE 2,553,658

METERING TAPE DISPENSER

Karl O. Larson, St. Paul, Minn., assignor to Minnesota Mining & Manufacturing Company, St. Paul, Minn., a corporation of Delaware Application July 17, 1948, Serial No. 39,355

5 Claims. (Cl. 33—131)

This invention relates to tape dispensers which meter the tape, more particularly to metering dispensers for pressure-sensitive adhesive tape.

Previous metering dispensers have had to be specially constructed throughout. It is therefore one of the objectives to provide a metering unit that can be used as an attachment to standard commercial dispensers with little or no alteration of the latter. Other objectionable features of previous devices include the use of a number of parts that must necessarily be exposed. One of the objectives is therefore the provision of a compact streamlined metering unit with a minimum of exposed or projecting parts.

The invention provides a metering unit that may be attached to or originally built in as a part of, tape dispensers that include a tape supply means and a severing means that is spaced from the supply means, the unit being positioned between the two.

The unit comprises a rotatable drum positioned to contact the tape and to be rotated thereby when the tape is drawn through the unit. A portion of the drum is hollow, with a measuring wheel mounted within the hollow portion to rotate independently of the drum. The drum is mounted for reciprocal as well as rotational movement. Pressure of the tape against the drum as it is being drawn through the machine moves the drum into engagement with the wheel, at the same time rotating the drum and thereby the wheel. Stops on and adjacent the wheel limit the distance through which the wheel can rotate, thereby halting the drum and with it the tape, after a desired length has been withdrawn. When tension on the tape is relaxed, as by severing, the drum automatically reciprocates or moves back to its normal position, thereby disengaging itself from the wheel, whereupon the wheel is rotated back to its normal or starting position by a spring; and the unit has thus reset itself, ready for a second complete metering cycle.

An illustrative device is described herein and illustrated in the accompanying drawings in which:

Figure 3 is a right side elevation of the unit with the disc that forms the side wall removed;

Figures 4 and 7 are views of the same parts as Figures 3 and 6, respectively, showing the position of certain parts during a metering operation.

Figure 1:
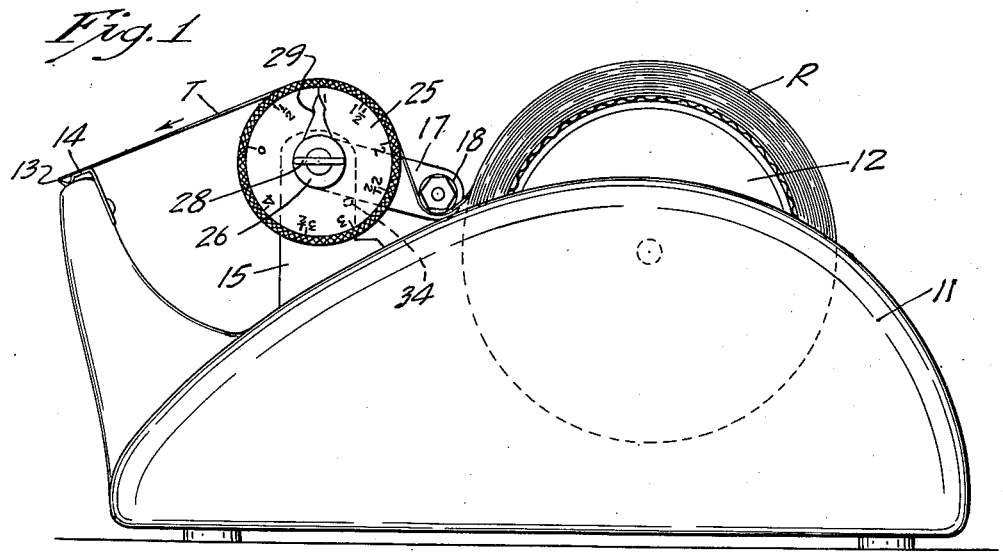
Figure 1 is a right side elevation.
Figure 2:
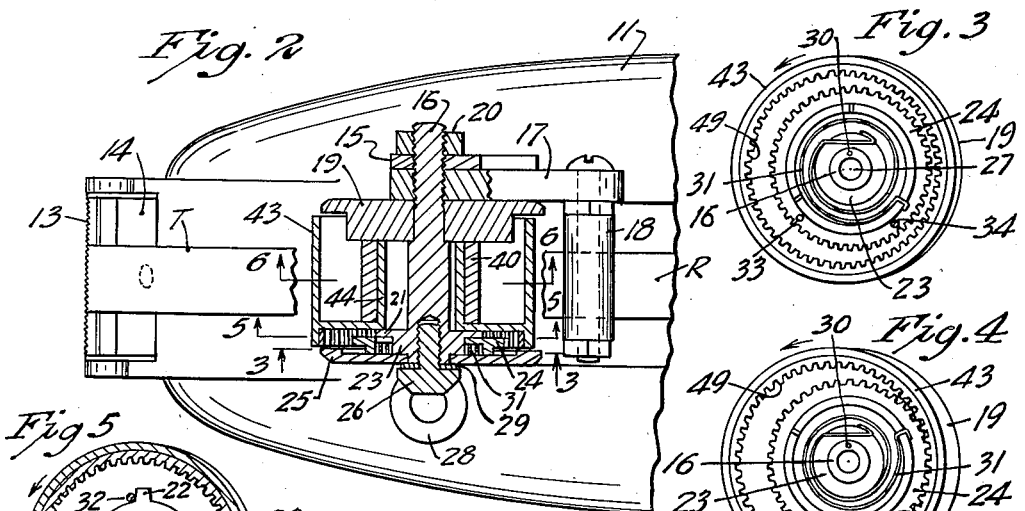
Figure 2 is a partial plan view with the metering unit in section.

At the rear of the base or body 11, a supply roll R of pressure-sensitive adhesive tape T is mounted on a rotatable supply drum 12. At the front is a severing edge 13, behind which is a shelf or ledge 14 to which the tape may adhere when brought into contact with the edge 13 in a severing operation.

The metering unit is located between the supply roll R and the severing means 13.

The metering unit is entirely supported by a single upright stud 15 which is fixed to the body 11 and extends upwardly therefrom. A fixed horizontal shaft 16 extending transversely of the machine, passes through an aperture in the stud wherein it fits freely. This serves as the main shaft of the unit. Immediately to the right of the stud, a rearwardly extending guide roll arm 17 is carried freely on the main shaft 16. An idler roller 18 which serves as a guide roll for the tape, is rotatably mounted on the rear end of the arm 17. Immediately to the right of the arm, a disc 19 is fixed to the shaft 16. By a nut 20 on the threaded outer end of the shaft 16, the shaft 16, arm 17 and disc 19 may be rendered fixed in relation to each other and to the base 11.

A stop disc 21 is fixed on the shaft 16 near the right end thereof. A fixed return stop 22 is located on the edge of the disc. Immediately to the right thereof a bearing member 23 is fixed on the shaft to support a metering wheel 24 which is journaled thereon. In the present embodiment, the wheel 24 is a gear wheel.

A disc 25 is freely mounted on the shaft next to the bearing member, with the end of the shaft 16 slightly less than flush with the outer or right surface of the disc.

The discs 19 and 25 form the left and right walls, respectively, of the unit.

The disc 25 is rendered fixed by a screw 26 which extends into a threaded hole 27 in the shaft, coaxially therewith, the head of the screw pressing the disc against the face of the bearing member 23 when the screw is turned inwardly by a thumb turn 28.

Between the head of the screw 26 and the outer face of the disc 25, a pointer 29 is fitted freely on the shaft 16. It is held fixed in a normal position, such as the "twelve o'clock" position shown in Figure 1, by a pin (not shown) on its inner face that extends freely into a small hole 30 that is bored in the end of the shaft 16.

A spring 31 with one end anchored in the fixed bearing member 23, the other in the rotatable measuring wheel 24, is loaded to impel the wheel 24 clockwise. A return catch 32 in the form of a projecting pin on the left or inside side of the gear 24, is positioned to engage the fixed return stop 22 when the measuring wheel is rotated clockwise by the spring 31 to a given normal or initial position in readiness to commence a complete metering cycle.

Figure 5:
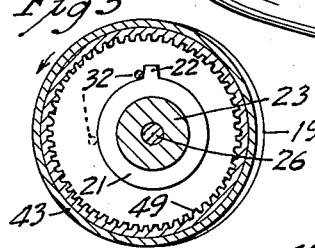
Figures 5 and 6 are sectional views of the unit.

The said normal or initial position of the measuring wheel 24 is shown in Figures 3 and 5. Figure 5 shows the said return catch 32 that is on the inside of the wheel 24, in section, in engagement with the fixed return stop 22. Figure 3 shows the outer or right side of the wheel 24 with a measuring catch 33 extending outwardly from its side surface in position to engage a measuring stop 34 (shown in section) that is on the inside of the disc 25, when the gear wheel 24 is rotated counter-clockwise. The said engagement of 33 and 34 is shown in Figure 4.

A drum supporting arm 40 is pivoted at 41 to the right or inside surface of the left hand disc 19. At its approximate mid-point, the arm is pierced by a relatively large horizontal bore 42 which extends laterally of the machine. A hollow drum 43 whose peripheral wall surrounds the arm 40, is rotatably supported by the arm by means of a hollow shaft 44 that extends from the right wall of the drum into the interior of the drum where it is journaled in the bore 42. The main shaft 16 extends through the hollow shaft 44. The two shafts are not necessarily concentric but their axes are parallel. The open left side or end of the drum is covered by the disc 19.

Figure 6:
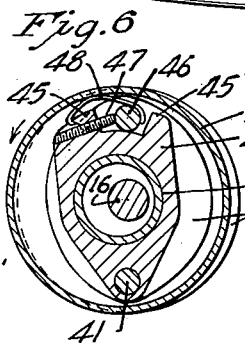

When the unit is in the said normal or initial position (Figures 3 and 5), the drum and its parts are in the position shown in Figure 6.

Two shoulders 45 and 45' extend upwardly from the upper or movable end of the arm 40 in spaced relation to each other. A fixed pin 46 projects inwardly or to the right from the inside or right side surface of the disc 19, extending between the shoulders 45—45' to serve as an arm stop. A set screw 47 in the forward shoulder 45 extends rearwardly towards the stop pin 46. A spring 48 impels the arm 40 clockwise about its pivot 41 so that the set screw 47 normally bears against the stop 46.

The normal or initial position of the parts of the metering unit when the device is in readiness for a full metering cycle, is shown in Figures 3, 5 and 6. When the tape T is grasped at its forward or leading end at the front of the machine and drawn in the direction of the arrow shown in Figure 1, the resulting pressure of the tape against the periphery of the drum 43 impels the drum and the arm 40 from their normal position shown in Figures 3 and 6 forwardly until the shoulder 45' strikes the arm stop 46 and halts the movement of the parts in the metering position shown in Figures 4 and 7. Gear teeth 49 on the inside of the peripheral wall of the drum 43 will then engage the gear wheel (measuring wheel) 24. Continued pulling of the tape rotates the drum and with it the measuring wheel counter-clockwise until the measuring catch 33 on the wheel 24 engages the measuring stop 34 on the disc 25. The tape being in temporary adhesive contact with the periphery of the drum, further withdrawal is thus halted.

The tape is then severed by drawing it downwardly across the cutting edge 13. This will adhere the uncut portion of the tape to the shelf 14. When the tape is lifted therefrom in preparation for withdrawing the next length, the pressure of the tape on the drum 43 will cease, whereupon the spring 48 will draw the arm 40 back to its normal position (Figure 6). This will disengage the gear wheel 24 from the teeth 49 (Figure 3), whereupon the spring 31 will rotate the gear wheel clockwise until the return catch 32 engages the return stop 22 (Figure 5). The parts will then again be in their normal initial positions in readiness for the next metering cycle.

It will be seen that the length of tape that can be withdrawn is governed by the distance that the measuring catch 33 travels from its normal position shown in Figure 3 until it strikes the stop 34 (Figure 4). This distance may be varied by loosening the screw 26, turning the disc 25 until the measuring stop 34 is a desired distance from the normal starting position of the measuring catch 33, and then tightening the screw.

The said desired distance may be made more readily ascertainable by suitable calibrations on the outside surface of the disc 25. When the disc 25 is turned clockwise until the measuring stop 34 on its inside surface touches the measuring catch 33, the latter being in its normal starting position shown in Figure 3, the zero mark on the disc will be opposite the fixed pointer 29. When adjusting the unit for a desired length, turning the disc 25 counter-clockwise increases the length of tape that will be dispensed in each normal metering cycle. The illustrated machine is shown as being adjusted for dispensing a 1" length. The 1" calibration is opposite the pointer 29.

Numerous alternatives and equivalents may be employed.

Figure 8:
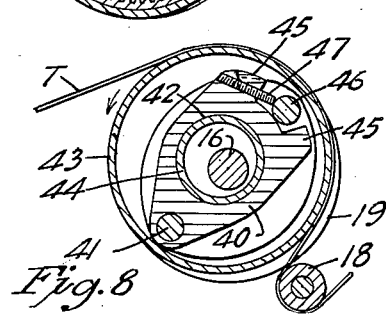
Figure 8 shows an alternative arrangement of parts.

For example, the drum arm spring 48 may be dispensed with by positioning the arm 40 so that it tips rearwardly and by positioning the guide roller 18 lower and/or closer in relation to the drum, as shown, for example, in Figure 8. The drum will then be impelled in a somewhat upward direction by pressure of the tape, and after the release of the said pressure the arm 40 and the drum 43 will fall by gravity from metering position back into the normal position shown in Figure 8.

The form of operative or driving engagement, here shown as a toothed engagement, between the drum 43 and the measuring wheel 24, may be any that will transmit rotary movement from one to the other. For example, it may be a frictional engagement, with the contacting surfaces relatively smooth; and the said contacting surfaces may be scored, knurled or coated with a suitable substance to increase friction.

Figure 7:
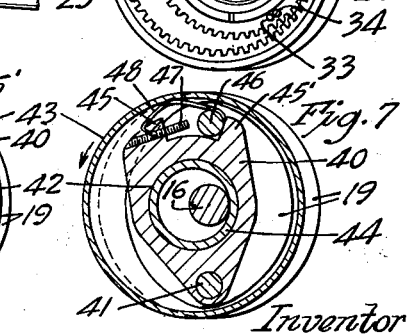

In Figure 7 the shafts 16 and 44 are shown in contact. Such contact is not necessary. The movement of the arm 40 is halted by engagement or contact of the shoulder 45' and the stop 46. However, the contact between the shafts 16 and 44 may be employed to halt the arm 40 in place of the contact of the shoulder 45' and the stop 46, if desired.

The release of tape pressure on the drum following a dispensing operation need not always await the lifting of the tape from the shelf 14. It may occur whenever the operator relaxes the pull on the tape. Consequently the unit may be reset before severance, or whenever desired.

Multiples of the unit length for which the machine is adjusted may thus be dispensed, if desired. The release of tape tension frequently occurs automatically immediately after severance because of slight adherence to the shelf 14 or for other reasons. The shelf 14 is of course not essential to the operation of the device.

I claim:

1. In a tape dispenser having a tape supply holding means and a severing means, a metering device located between the supply and the severing means comprising a drum positioned to contact the tape and to be rotated thereby as the tape is drawn from the supply to the severing means, a portion of the drum being hollow, a measuring wheel within the hollowed portion of the drum mounted to rotate freely in respect to the drum, catch means on the wheel, stop means adjacent the wheel for engaging the catch means when the wheel has rotated a given distance, and a movable drum-mounting means permitting rotation of the drum about its own axis and permitting movement of the drum into and out of driving engagement with the wheel.

2. In a tape dispenser having a tape supply holding means and a severing means, a metering device located between the supply and the severing means comprising a drum positioned to contact the tape and to be rotated thereby as the tape is drawn from the supply to the severing means, a portion of the drum being hollow, a measuring wheel within the hollowed portion of the drum mounted to rotate freely in respect to the drum, a measuring stop and a return stop adjacent the wheel, catch means on the wheel for engaging the stops upon rotation of the wheel to limit the distance of rotation, and a movable drum-mounting means permitting rotation of the drum about its own axis and movement of the drum into driving engagement with the wheel in response to pressure of the tape against the drum when the tape is drawn through the machine from the supply towards the severing means.

3. In a tape dispenser having a tape supply holding means and a severing means, a metering device located between the supply and the severing means comprising a drum positioned to contact the tape and to be rotated thereby as tape is drawn from the supply to the severing means, a portion of the drum being hollow, a measuring wheel of less diameter than that of the inside diameter of the hollowed portion of the drum rotatably mounted therein, a movable drum-mounting means permitting rotation of the drum about its own axis and permitting movement of the drum into driving engagement with the wheel in response to pressure of the tape against the drum when tape is drawn through the machine, a catch on the wheel, a measuring stop adjacent the wheel positioned to engage the catch after the wheel has been turned a given distance by the drum in one direction, spring means loaded to rotate the wheel in the opposite direction, and a return stop adjacent the wheel positioned to halt the wheel after the spring means has rotated the wheel to a given initial position in readiness for a complete metering cycle.

4. In a tape dispenser having a tape supply holding means and a severing means, a metering device located between the supply and the severing means comprising a drum positioned to contact the tape and to be rotated thereby as the tape is drawn from the supply to the severing means, a portion of the drum being hollow, a measuring wheel of less diameter than that of the inside diameter of the hollowed portion of the drum rotatably mounted therein, a catch on either side of the wheel, a stop adjacent the wheel on either side to engage the respective catches, spring means for impelling the wheel to rotate in one direction, and a drum mounting means permitting rotation of the drum about its own axis and oscillation of the drum into and out of driving engagement with the wheel.

5. In a tape dispenser having a tape supply holding means and a severing means, a metering device located between the supply and the severing means comprising a hollow drum positioned to contact the adhesive side of the tape with its periphery and to be rotated thereby as the tape is drawn from the supply to the severing means, gear teeth on the inside surface of the peripheral wall of the drum, a gear wheel of less diameter than the inside diameter of the drum rotatably mounted within the drum, a movable drum-mounting means permitting rotary movement of the drum about its own axis and reciprocal movement of the drum into engagement with the gear wheel in response to pressure of the tape against the periphery of the drum when the tape is drawn from the supply to the severing means, the said mounting means comprising a pivoted arm inside the drum and means for rotatably mounting the drum on the arm at a point removed from the pivot, a measuring catch and a return catch on the gear wheel, a measuring stop adjacent the gear wheel positioned to engage the measuring catch when the gear has been rotated by the drum from a normal starting position a given distance in one direction, spring means loaded to rotate the gear in the other direction, and a return stop adjacent the gear positioned to engage the return catch when the gear has been rotated by the spring back to the said normal starting position.

KARL O. LARSON.

REFERENCES CITED

The following references are of record in the file of this patent:

UNITED STATES PATENTS

| Number | Name | Date |
|---|---|---|
| 2,251,942 | Kimball | Aug. 12, 1941 |
| 2,291,668 | Weigolt | Aug. 4, 1942 |
| 2,424,488 | Morin | July 22, 1947 |